US012744914B2

(12) United States Patent
Fleureau et al.

(10) Patent No.: US 12,744,914 B2
(45) Date of Patent: Sep. 22, 2026

(54) METHODS AND DEVICES FOR PROGRESSIVE ENCODING AND DECODING OF MULTIPLANE IMAGES

(71) Applicant: InterDigital CE Patent Holdings, SAS, Paris (FR)

(72) Inventors: Julien Fleureau, Rennes (FR); Bertrand Chupeau, Rennes (FR); Renaud Dore, Rennes (FR); Franck Thudor, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/719,969

(22) PCT Filed: Dec. 7, 2022

(86) PCT No.: PCT/EP2022/084713
§ 371 (c)(1),
(2) Date: Jun. 14, 2024

(87) PCT Pub. No.: WO2023/110562
PCT Pub. Date: Jun. 22, 2023

(65) Prior Publication Data

US 2025/0056016 A1 Feb. 13, 2025

(30) Foreign Application Priority Data

Dec. 17, 2021 (EP) .................................... 21306825

(51) Int. Cl.
*H04N 19/172* (2014.01)
*H04N 19/119* (2014.01)
(Continued)

(52) U.S. Cl.
CPC ......... *H04N 19/172* (2014.11); *H04N 19/119* (2014.11); *H04N 19/136* (2014.11); *H04N 19/46* (2014.11)

(58) Field of Classification Search
CPC .. H04N 19/172; H04N 19/119; H04N 19/136; H04N 19/46
See application file for complete search history.

(56) References Cited

U.S. PATENT DOCUMENTS

2017/0244948 A1* 8/2017 Pang .................... H04N 23/957
2018/0020204 A1* 1/2018 Pang ...................... H04N 23/90
(Continued)

FOREIGN PATENT DOCUMENTS

WO WO 2021240069 A1 12/2021

OTHER PUBLICATIONS

IEC, IEC2021 (Information technology—Coded representation of immersive media—Part 12: MPEG Immersive video), Dec. 14, 2021 ( Year: 2021).*

(Continued)

*Primary Examiner* — Zaihan Jiang
(74) *Attorney, Agent, or Firm* — Condo Roccia Koptiw LLP

(57) ABSTRACT

Methods and devices for encoding, decoding and transmitting a three-dimensional scene initially represented as a multiplane image (MPI) are provided. Each layer of the MPI is split into patches based on the transparency component. Patches of a layer are grouped in a tile. The greater the depth of the layer, the greater the identifying number of the tile. When several tiles are packed in an atlas image, the same monotonic (i.e. ascending or descending) function according to depth applies to atlas numbers. At the decoding side, the current viewport to render is initially cleared and each decoded tile is sequentially blended over from the nearest
(Continued)

one to the furthest due to the numbering of the set of atlases and tiles. Pixels of a patch under rendering are projected onto pixels of the viewport image according to the depth of the tile comprising the patch and metadata indicating the position of the patch in the layer of the MPI the patch has been clustered from.

18 Claims, 4 Drawing Sheets

(51) Int. Cl.
*H04N 19/136* (2014.01)
*H04N 19/46* (2014.01)

(56) References Cited

U.S. PATENT DOCUMENTS

2018/0035134 A1* 2/2018 Pang .................... H04N 13/117
2018/0089903 A1* 3/2018 Pang ...................... H04N 23/45
2018/0189323 A1* 7/2018 Wheeler ................. G06F 16/29
2018/0288423 A1* 10/2018 Vembar ..................... G06T 9/00
2018/0288433 A1* 10/2018 Oh ....................... H04N 7/0127
2020/0162745 A1* 5/2020 Hindriks ................. G06T 15/40
2020/0393567 A1* 12/2020 Schroeter ................ G01S 19/01
2021/0092371 A1* 3/2021 Han ..................... H04N 19/119
2021/0105492 A1* 4/2021 Aksu .................. H04N 21/2362
2021/0168389 A1* 6/2021 Meardi ................ H04N 7/0806

OTHER PUBLICATIONS

Jonathan Shade, Tiling Layered Depth Images Feb. 12, 2007 (Year: 2007).*

Boyce et al., “MPEG Immersive Video Coding Standard”, Institute of Electrical and Electronics Engineers (IEEE), Proceedings of the IEEE, vol. 109, Issue No. 9, Sep. 2021, 16 pages.

“Information technology—Coded Representation of Immersive Media—Part 5: Visual Volumetric Video-based Coding (V3C) and Video-based Point Cloud Compression (V-PCC)”, International Organization for Standardization, ISO/IEC JTC 1/SC 29/WG 07, ISO/IEC 23090-5:2021(2E), 2021, 370 pages.

“Information technology—Coded representation of immersive media—Part 12:MPEG Immersive video”, International Organization of Standardization (ISO) and International Electrotechnical Commission (IEC), ISO/IEC JTC 1/SC 29, ISO/IEC 23090-12:2021(E), FDIS Stage, 2021, 83 pages.

* cited by examiner

METHODS AND DEVICES FOR PROGRESSIVE ENCODING AND DECODING OF MULTIPLANE IMAGES

1. TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric content on end-user devices such as mobile devices or Head-Mounted Displays (HMD). The present principles particularly relate to volumetric scenes represented by a multiplane image.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

A multiplane image (MPI) is a layered representation of a volumetric scene where each layer is actually a slice of the 3D space of the scene. Each slice is sampled according to an underlying central projection (e.g. perspective, spherical, . . . ) and a sampling law which defines the interlayer spacing. A layer comprises color as well as transparency information of any 3D intersecting object of the scene. From this sliced representation, it is possible to recover/synthesize any viewpoint located in a limited region around the center of the underlying projection. It can be performed making use of algorithms (e.g. "reversed" Painter's algorithm) which blend each layer with the proper weights (i.e. transparency) starting from the nearest to the furthest layer. Such techniques may run faster than other known view synthesis processes.

The way the transparency weights are computed as well as the number of slices chosen for the representation condition the quality of the view synthesis. When these parameters are properly chosen, an MPI-based view synthesis process allows for "smooth" representation of object borders and in a more general manner better robustness to contour and geometry artifacts than other view synthesis algorithms. Encoding a MPI may require a large amount of data as each layer is a full-size four-component image (i.e. three components for color and one for transparency).

A way to encode volumetric scenes is to pack samples of projected parts of the scene (called patches) into a large image (called atlas). It is possible to encode a MPI as a patch atlas. However, such a representation tends to require bigger atlases than other representations of the volumetric scene. Mechanisms to actively control the memory and processing resources at the rendering side are missing.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method comprising:

obtaining metadata and tiles, wherein metadata comprise information associating each tile with a depth and each tile having a tile number determined as a monotonic function of the corresponding depth;

generating a viewport image by decoding and blending tiles in the viewport image in the monotonic order of the tile numbers.

The present principles also relate to a device comprising a memory associated with a processor configured for implementing the method above.

The present principles also relate to a method comprising:

obtaining a multiplane image comprising at least two layers, a layer having a depth and pixels of a layer having a transparency component;

for each layer of the multiplane image, splitting the layer in patch pictures based on the transparency component;

packing the patch pictures in a tile, a tile having a tile number determined as a monotonic function of the depth of the layer;

generating a metadata associating the tile with the depth of the layer; and encoding the tiles and the metadata in a data stream.

The present principles also relate to a device comprising a memory associated with a processor configured for implementing the method above.

4. BRIEF DESCRIPTION OF DRAWINGS

The present disclosure will be better understood, and other specific features and advantages will emerge upon reading the following description, the description making reference to the annexed drawings wherein.

5. DETAILED DESCRIPTION OF EMBODIMENTS

Figure 1:
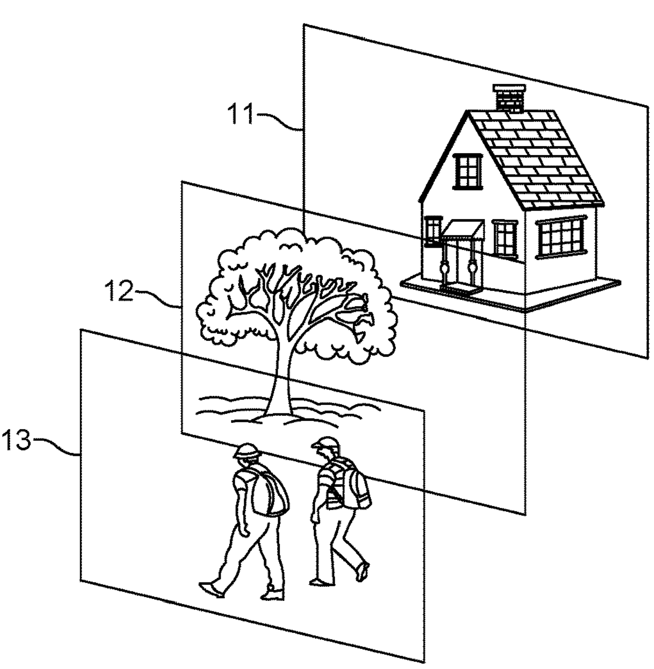
FIG. 1 shows a representation of a multiplane image, according to a non-limiting embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

FIG. 1 shows a representation of a multiplane image. In the example of FIG. 1, the multiplane image (MPI) is composed of three layers 11, 12 and 13 from the background to the foreground according to a perspective center of projection. The number of layers and the part of the volumetric scene projected onto each layer may vary. For instance, the two characters of layer 13 may be represented on two separate layers. The distance between each layer may also vary to be representative of the difference of depth (i.e. distance to the center of projection) of objects represented onto two consecutive layers. The type of projection may differ too. For instance, a panoramic MPI would be represented as concentric cylinders. A 360° MPI would be represented as concentric spheres or cubes, for example.

Pixels of the layers may carry different component information like color, specular and/or normal vectors. In addition, each layer carries transparency information (e.g. a per-pixel scalar value comprised between 0 and 1) representing the level of transparency of each pixel of the layer frame. Such a level is typically set to 1 when the pixel is associated with a non-contour part of an opaque surface, but it may be lower when it is associated with an object contour or even with a transparent object.

From this sliced representation, it is possible to synthesize any viewpoint located in a limited region around the center of the underlying projection. It can be done making use of algorithms (e.g. "reversed" Painter's algorithm) which blend each layer with the proper weights (transparency) starting from the nearest to the furthest. According to the location of the viewpoint, occultations of objects of the background by objects of the foreground may differ, allowing an observer to experience a parallax effect and to perceive the volume of the scene by lightly translating his head, and so his eyes. Given a viewport camera, pixels of the layers are projected and blended from the closest to the furthest by taking the associated transparency values into account. As soon as the cumulated/blended transparency of a given pixel of the viewport is saturated (i.e. greater than 1), then occulted pixels of more distant layers are discarded. The simplicity of the synthesis stage relies on the fact that all the complexity (visibility, anti-aliasing, etc.) is handled when the MPI itself is created and not when the view synthesis is generated.

Figure 2:
FIG. 2 shows a representation of a volumetric scene sliced in layers according to a spherical projection, according to a non-limiting embodiment of the present principles.

FIG. 2 shows a representation of a volumetric scene sliced in layers according to a spherical projection. The 3D volumetric scene is automatically sliced in numerous layers. Such layers of a MPI comprise large areas entirely transparent. So, it is possible to cluster more or less opaque pixels (transparency greater than zero) of each layer and to pack the patch pictures of the clustered pixels into an atlas image.

MPEG-I/MPEG Immersive Video (MIV) is a standardization work to encode volumetric scenes. In MIV, volumetric scenes are samples of projected parts of the scene (called patches or patch pictures) packed into a large image (called atlas or atlas image). Each layer of the MPI is considered as an independent view with constant depth (the layer depth). Each patch of the set of atlases is a subpart of a layer. The footprint of a path may be cumulated/aggregated for several consecutive MPIs of a sequence of MPIs, for example on an intra-period and with constant depth. The depth information of each patch (a constant) is stored in associated metadata. So, there is no need to encode a geometry component carrying the depth of each projected point. The additional transparency information part of the MPI is however stored in a dedicated transparency component. At the decoding side, it is straightforward to recover the initial MPI by re-assembling patches of the atlases on layers at the depth indicated in the metadata. However, the atlas-based decoding process imposes to decode the whole set of atlases first and then, to provide the decoded atlases to the synthesis stage for a proper rendering. Such a way of proceeding has two drawbacks in the case of a MPI encoding/decoding. First, it imposes that the whole active part of the MPI, which may be quite important, is in memory before the synthesis stage. Second, it does not take advantage of the fact that for a MPI synthesis, the patches could be processed from the closest one to the furthest.

Figure 3:
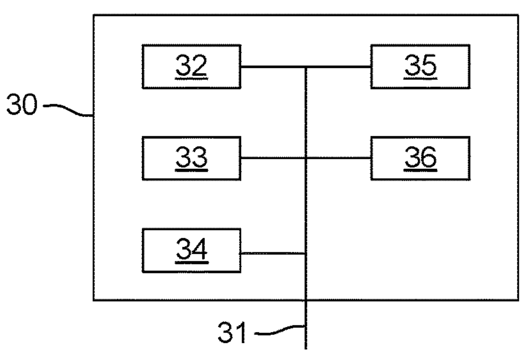
FIG. 3 shows an example architecture of a device which may be configured to implement a method according to a non-limiting embodiment of the present principles.

FIG. 3 shows an example architecture of a device 30 which may be configured to implement a method described according to the present principles. Alternatively, each circuit of the encoder and/or the renderer may be a device according to the architecture of FIG. 3, linked together, for instance, via their bus 31 and/or via I/O interface 36.

Device 30 comprises following elements that are linked together by a data and address bus 31, a microprocessor 32 (or CPU), which is, for example, a DSP (or Digital Signal Processor), a ROM (or Read Only Memory) 33, a RAM (or Random Access Memory) 34, a storage interface 35, an I/O interface 36 for reception of data to transmit, from an application, and a power supply (not illustrated), e.g. a battery.

In accordance with an example, the power supply is external to the device. In each of mentioned memory, the word «register» used in the specification may correspond to area of small capacity (some bits) or to very large area (e.g. a whole program or large amount of received or encoded or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, device 30 is configured to implement a method described according to the present principles, and belongs to a set including: a mobile device, a communication device, a game device, a tablet (or tablet computer), a laptop, a video camera, an encoding chip, and a server (e.g. a broadcast server, a video-on-demand server or a web server).

Figure 4:
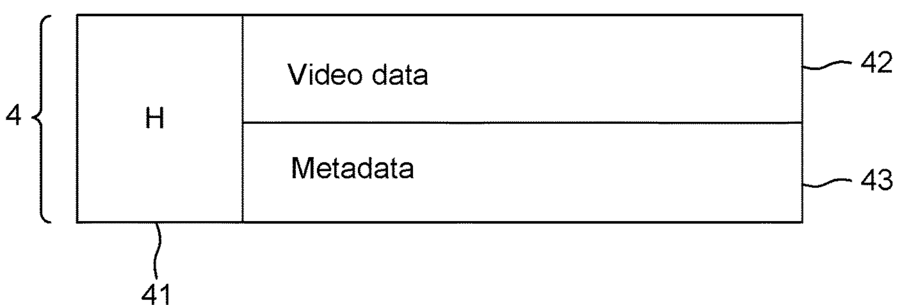
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax element of the stream. For example, the header part comprises metadata about syntax elements, describing the nature and the role of each. The header part may also comprise metadata like the coordinates of the underlying point of view used for generating the MPI. The structure comprises a payload including video data 42 and metadata 43. Syntax element 42 includes data representative of the transparency of layers of the MPI. In variants, it may also be representative of other rendering components like color, specular reflectance, and local depth of patch pictures. Images may have been compressed according to a video compression method.

Element of syntax 43 is a part of the payload of the data stream and may include metadata about how frames of element of syntax 42 are encoded, for instance parameters used for projecting and packing points of a 3D scene onto frames. Such metadata may be associated with each frame of the video or with a group of frames (also known as Group of Pictures (GoP) in video compression standards).

Figure 5:
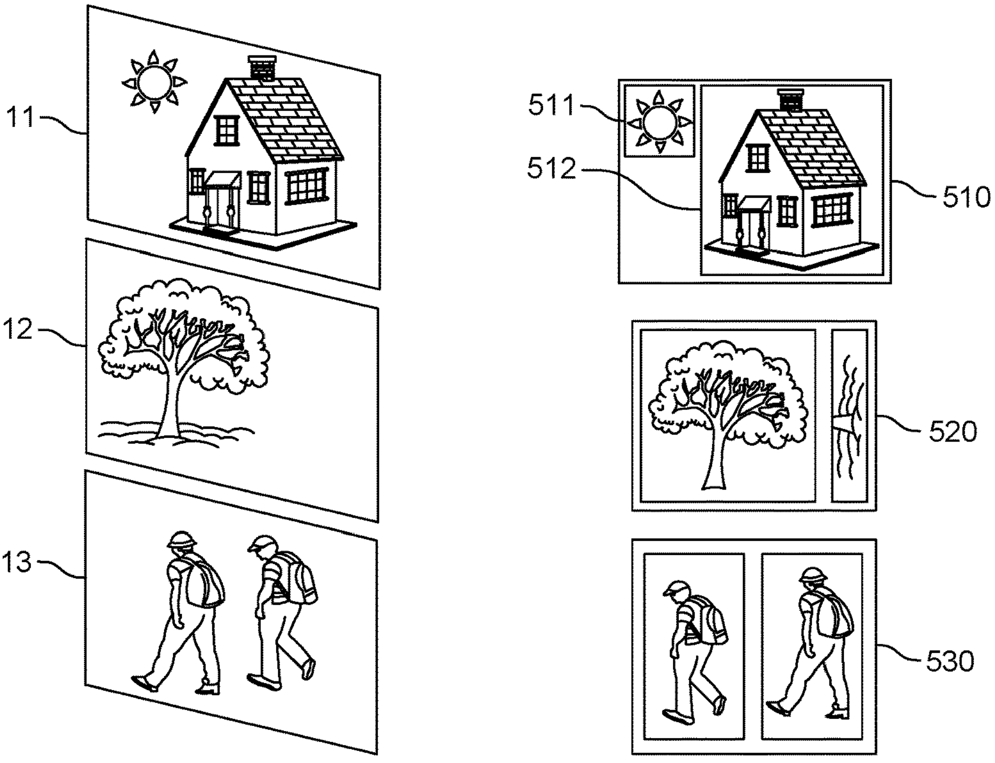
FIG. 5 illustrates the conversion of the MPI of FIG. 1 to an atlas or to a set of atlases according to a non-limiting embodiment of the present principles.

FIG. 5 illustrates the conversion of the MPI of FIG. 1 to an atlas or to a set of atlases according to the present principles. In the example of FIG. 5, the MPI contains layers 11, 12 and 13. Layers are split in patches on a transparency base. For instance, layer 11 is split in patches 511 and 512. Each ray of the sun may be represented in an independent patch as, in the example of FIG. 5, they are not directly connected to the central circle of the sun. Patches of a layer are organized into groups. A group may contain patches belonging to one layer only. So, patches of a group may have the same depth. In FIG. 5, patches 511 and 512 of layer 11 are organized in group 510. Patches of layer 12 are grouped in group 520. Patches may be re-oriented in the group, for example to decreasing the size needed to pack them. Patches of layer 13 are packed in group 530. A group of patches is an image (that can be considered an atlas image) encoded in a V3C/HEVC/VVC tile. The coding or the decoding of such tiles is independent from the coding or the decoding of other tiles. A tile has a unique tile number to identify it. According to the present principles, each tile number is set as a monotonic function (i.e. only ascending or only descending) of the corresponding depth; that is, tile numbers increase according to the depth of the patches extracted from the layer the tile contains. Metadata associating each tile with the depth of the corresponding layer is generated and encoded in the data stream in association with the tile. In the example of FIG. 5, the tile of group 530 has the lowest tile number (for instance 0) of the set of three tiles. The tile of group 520 has a tile number greater than the tile of group 530 because layer 12 has a greater depth than layer 13 (for instance 1). And the tile of group 510 has a tile number greater than the tile of group 520 because layer 11 has a greater depth than layer 12 (for instance 2).

Figure 6:
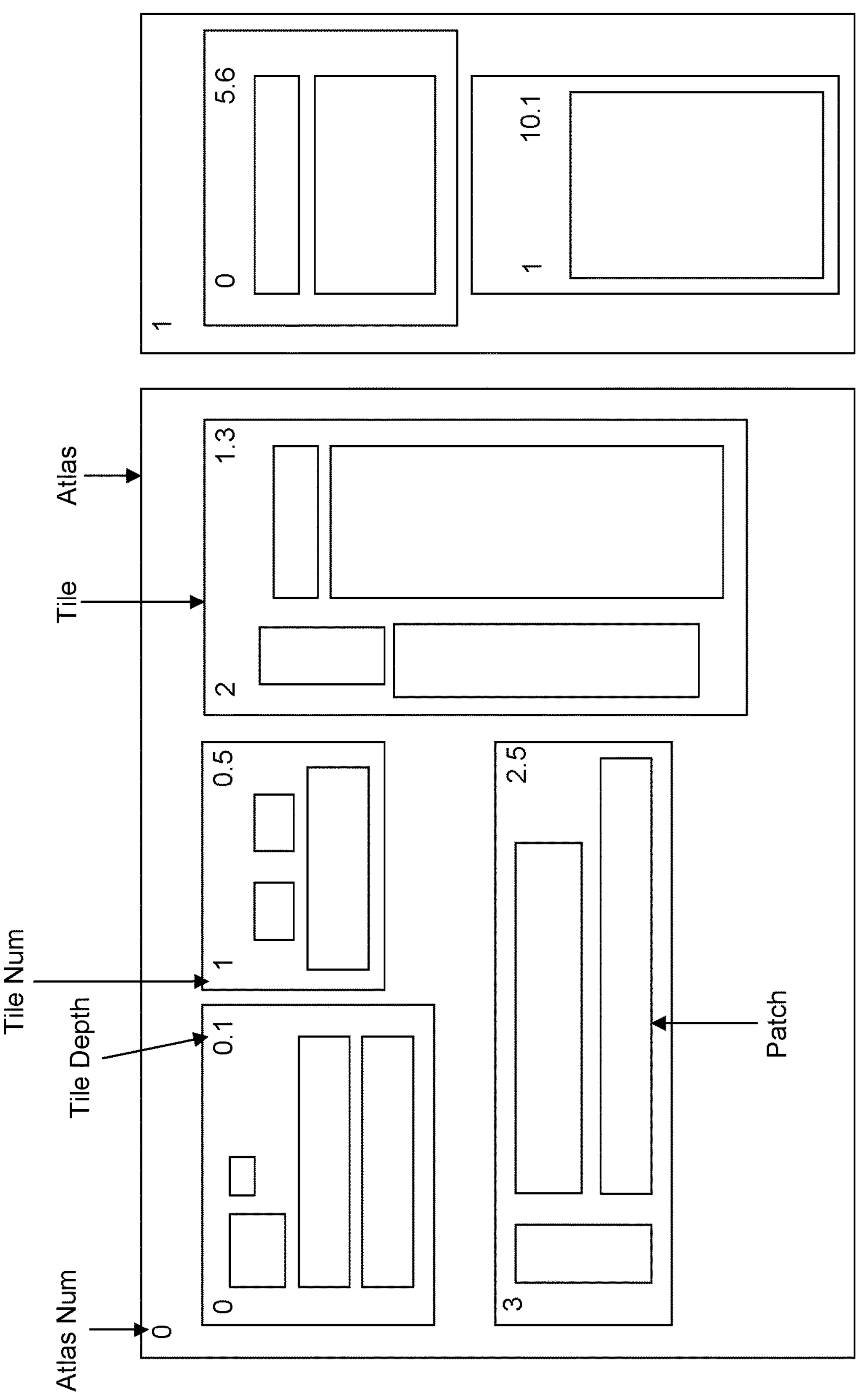
FIG. 6 illustrates the packing of groups of patches in a plurality of atlases according to a non-limiting embodiment of the present principles.

FIG. 6 illustrates the packing of groups of patches in several atlases. According to an embodiment of the present principles, the tiles of groups of patches obtained as described in relation to FIG. 5 are packed in bigger images called atlases or atlas images. Atlases have a unique atlas number used to identify them. The atlas number of a given atlas is set so that the depth associated with the first tile (i.e. the tile with the lowest tile number) that the atlas contains is greater than the depth of the last tile (the tile with the greatest number) of any other atlas with a lower atlas number. Within each atlas, the tile numbers are determined according to the principles described in relation to FIG. 5.

Other sorting conventions of the atlas/tile numbers may be considered without any change in the main principle of these principles.

At the decoding stage, each involved tile is decoded and rendered one after the other in monotonic (i.e. ascending or descending) order of atlas and tile numbers. The current viewport to render is initially cleared and each decoded tile is sequentially blended over from the nearest one to the furthest due to the numbering of the set of atlases and tiles. Pixels of a patch under rendering are projected onto pixels of the viewport image according to the depth of the tile comprising the patch and metadata indicating the position of the patch in the layer of the MPI the patch has been clustered from. Projected pixels are blended from the closest to the furthest by taking the associated transparency values into account. When the cumulated/blended transparency of a given pixel of the viewport image is saturated (i.e. equal to or greater than 1), then all later blended fragments are discarded. At most one tile is present in memory for each atomic rendering. This significantly limits the amount of memory requested at the decoding stage. According to the present principles, when network limitations occur, the rendering of a scene is still partly possible without having received the entire set of tiles or atlases. Like what is done with multi-scale 2D images where the image is rendered from its coarsest level to its finest, the progressive rendering according to the present principles allows a progressively rendering the volumetric scene from the foreground to the background.

Figure 7:
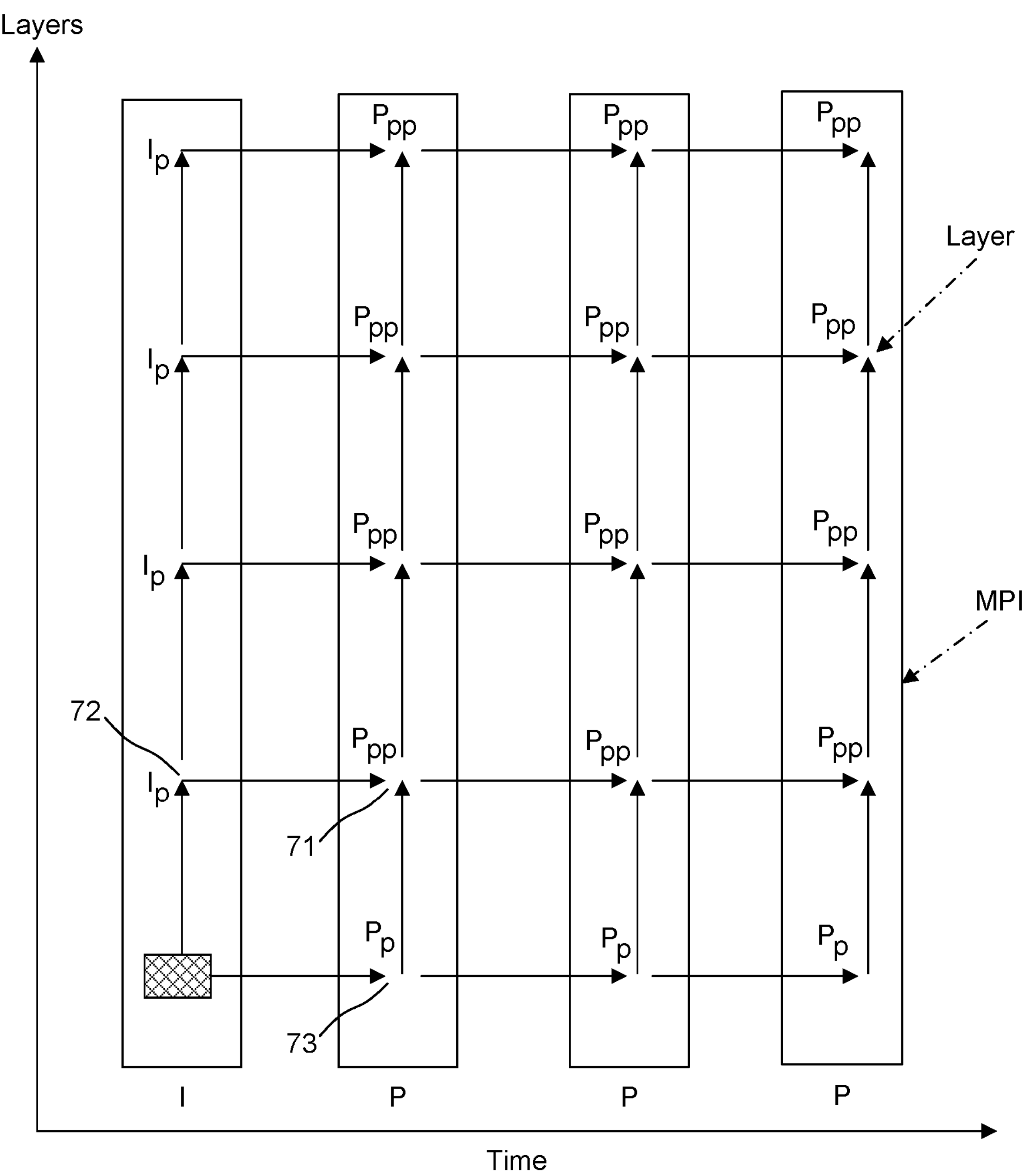
FIG. 7 illustrates a non-limiting embodiment of the present principles wherein an inter-layer prediction is performed at the decoding stage.

FIG. 7 illustrates an embodiment of the present principles wherein an inter-layer prediction is performed at the decoding stage. In this embodiment, each atlas corresponds to one layer. Each atlas contains one tile with one patch that is an entire layer of the MPI. In this embodiment, layers of the MPI are not split in patches. An inter-layer prediction process is performed at the decoding stage to reduce the overall bitrate while ensuring a progressive rendering.

Indeed, significant similarities in the content of two consecutive layers of an MPI often occur. It is, for example, the case when parts of the volumetric scene fall just in between two layers. In that case some overlapping exist, allowing the prediction of a layer from the previous one.

In this embodiment, a recursive scheme is implemented by the decoder where, in addition to being temporally predicted from the previous frame, a layer is also predicted from the previous layer in depth. For example, atlas 71 is temporally predicted by using corresponding atlas 72 in the previous 3D scene. Indeed, atlas 72 is the representation of the same layer of the previous MPI in the sequence of MPIs. At the same time, according to the present principles, atlas 71 is also partially spatially predicted from atlas 73 which is the representation of the layer of the same MPI with a depth directly lower than the depth of atlas 71. This double prediction implies a bitrate reduction while ensuring a progressive rendering. In this embodiment, the decoding of the current atlas/tile requires keeping the previous atlas/tile in memory.

MV-HEVC and ML-VVC are extensions of, respectively, HEVC and VVC for multi-view/multi-layer extensions. They are designed to encode multi-view content (e.g., content acquired from a rig of cameras where views share a lot of similarity). They use spatial inter-view prediction (prediction from the other views at the same timestamp) in addition to temporal inter-view prediction (prediction from the same view at different timestamps). According to the present principles, such codec extensions may be used by replacing the multi-view input by the set of layers of an MPI.

When a MPI contains a large number of layers, using this embodiment requires hundreds of video sequences to be fed into the multi-view video codec, with the video codec performing predictions from one video sequence to another in addition to temporal prediction within each video sequence. However, when dealing with low-resolution MPIs for which the number of layers is limited, the 2D video resolution of each layer is reduced as well as the number of layers, allowing a performant decoding. Moreover, the coding scheme of this embodiment is recursive with only one spatial/temporal frame used for prediction, which is well suited to real-time encoding. Indeed, hardware encoders such as NVENC use such a coding configuration when dealing with real-time encoding tasks.

According to the present principles, the representation of a MPI (or a sequence of MPIs) is encoded for allowing a progressive rendering at the decoder side. This feature and corresponding parameters are indicated in metadata associated with the payload content. A possible way to structure metadata is provided in the following table:

| | Descriptor |
|---|---|
| vps_miv_extension( ) { | |
| vme_geometry_scale_enabled_flag | u(1) |
| vme_embedded_occupancy_enabled_flag | u(1) |
| if( !vme_embedded_occupancy_enabled_flag ) | |
| vme_occupancy_scale_enabled_flag | u(1) |
| group_mapping( ) | |
| vme_progressive_rendering_enabled_flag | u(1) |
| if(vme_progressive_rendering_enabled_flag ) { | |
| vme_num_progressive_atlases_minus1 | u(6) |
| for( i = 0; i <= vme_num_progressive_atlases_minus1; i++ ) { | |
| vme_progressive_atlas_id[ i ] | u(6) |
| } | |
| } | |
| } | |

vme_progressive_rendering_enabled_flag is a binary value that indicates whether a progressive rendering is possible or not at the rendering and if so, an array indicating which subset of atlases of the entire atlas set is concerned by this feature is indicated. Indeed, some atlases may contain the description of a part of the 3D scene that has been organized to be progressively decoded and some other atlases not prepared for a progressive rendering.

The other metadata items in the table are known by persons skilled in the art.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:

obtaining, from a bitstream that indicates volumetric content, a plurality of tiles, wherein each tile is associated with a respective single-layer depth; and determining, based on the single-layer depths associated with the plurality of tiles, a monotonic order of the plurality of tiles; and according to the monotonic order:

decoding a first tile of the plurality of tiles;

blending the first tile onto a viewport image to progressively render the volumetric content; and releasing decoded data associated with the first tile prior to decoding a next tile of the plurality of tiles based on the monotonic order.

2. The method of claim 1, further comprising receiving, in the bitstream, an indication that the plurality of tiles are organized for progressive rendering by the monotonic order, wherein decoding of the plurality of tiles is performed according to the monotonic order based on the indication.

3. The method of claim 1, wherein the method further comprises:

receiving, in the bitstream, a plurality of atlases, wherein each atlas of the plurality of atlases comprises a respective atlas identifier and one or more tiles of the plurality of tiles, and wherein the atlas identifiers indicate an ordering of the atlases such that tiles of atlases having smaller atlas identifiers are associated with single-layer depths that are closer to the viewport image than tiles of atlases having larger atlas identifiers.

4. The method of claim 1, wherein each tile of the plurality of tiles comprises:

a respective tile identifier that corresponds to the single-layer depth associated with the tile, wherein the tile identifiers increase monotonically according to the single-layer depths, and a respective set of patches, wherein the patches of each tile are grouped based on the single-layer depth associated with the tile.

5. The method of claim 1, wherein blending the first tile onto the viewport image comprises projecting and blending color information and transparency information of the first tile onto the viewport image based on the single-layer depth associated with the first tile.

6. The method of claim 1, wherein the volumetric content is progressively rendered in a sequential order such that the tiles associated with depth layers nearest to the viewport image are rendered before tiles associated with depth layers farthest from the viewport image.

7. The method of claim 1, wherein decoded data for no more than one tile of the plurality of tiles is retained at any time during rendering of the volumetric content.

8. The method of claim 1, wherein rendering of the volumetric content is performed while maintaining a bounded decoded-data working set during rendering of the volumetric content.

9. The method of claim 1, wherein decoding and rendering of the plurality of tiles is performed prior to receiving all tiles of the plurality of tiles in the bitstream.

10. A device comprising:

a processor configured to:

obtain, from a bitstream that indicates volumetric content, a plurality of tiles, wherein each tile is associated with a respective single-layer depth;

determine, based on the single-layer depths associated with the plurality of tiles, a monotonic order of the plurality of tiles; and according to the monotonic order:

decode a first tile of the plurality of tiles;

blend the first tile onto a viewport image to progressively render the volumetric content; and release decoded data associated with the first tile prior to decoding a next tile of the plurality of tiles based on the monotonic order.

11. The device of claim 10, wherein the processor is further configured to receive, in the bitstream, an indication that the plurality of tiles are organized for progressive rendering by the monotonic order, wherein the plurality of tiles are decoded according to the monotonic order based on the indication.

12. The device of claim 10, wherein the processor is further configured to:

receive, in the bitstream, a plurality of atlases, wherein each atlas of the plurality of atlases comprises a respective atlas identifier and one or more tiles of the plurality of tiles, and wherein the atlas identifiers indicate an ordering of the atlases such that tiles of atlases having smaller atlas identifiers are associated with single-layer depths that are closer to the viewport image than tiles of atlases having larger atlas identifiers.

13. The device of claim 10, wherein each tile of the plurality of tiles comprises:

a respective tile identifier that corresponds to the single-layer depth associated with the tile, wherein the tile identifiers increase monotonically according to the single-layer depths, and a respective set of patches, wherein the patches of each tile are grouped based on the single-layer depth associated with the tile.

14. The device of claim 10, wherein the processor being configured to blend the first tile onto the viewport image comprises the processor being configured to:

project and blend color information and transparency information of the first tile onto the viewport image based on the single-layer depth associated with the first tile.

15. The device of claim 10, wherein the volumetric content is progressively rendered in a sequential order such that the tiles associated with depth layers nearest to the viewport image are rendered before tiles associated with depth layers farthest from the viewport image.

16. The device of claim 10, wherein decoded data for no more than one tile of the plurality of tiles is retained at any time during rendering of the volumetric content.

17. The device of claim 10, wherein the processor is further configured to maintain a bounded decoded-data working set during rendering of the volumetric content.

18. The device of claim 10, wherein the processor is further configured to decode and render the plurality of tiles prior to receiving all tiles of the plurality of tiles in the bitstream.

* * * * *